Aug. 31, 1926. 1,597,917
F. L. MAEDLER
METHOD AND APPARATUS FOR EFFICIENTLY UTILIZING HEAVY FUELS FOR
OPERATING INTERNAL COMBUSTION ENGINES
Filed June 17, 1925
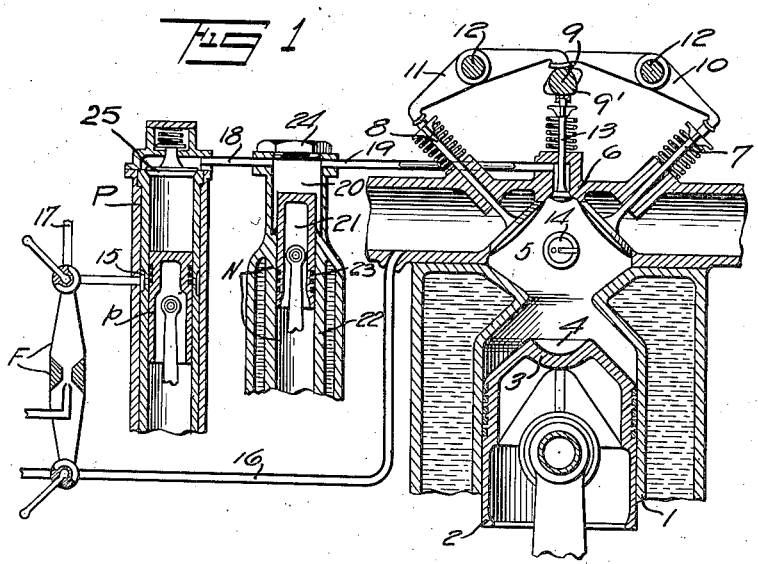
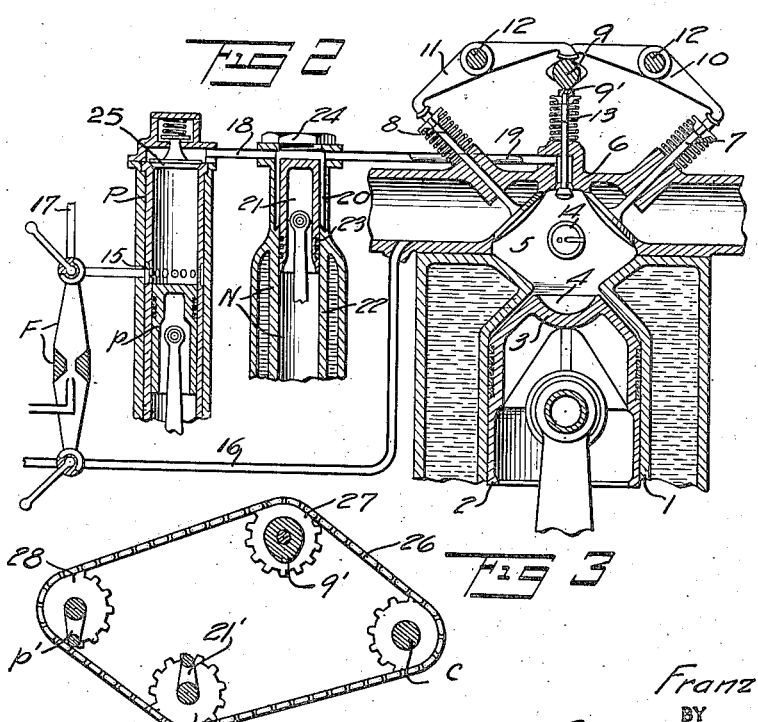
INVENTOR
Franz L. Maedler
BY
ATTORNEY Patented Aug. 31, 1926.

1,597,917

UNITED STATES PATENT OFFICE.

FRANZ L. MAEDLER, OF BERLIN, GERMANY, ASSIGNOR TO MAEDLER ENGINE CORPORATION, A CORPORATION OF MARYLAND.

METHOD AND APPARATUS FOR EFFICIENTLY UTILIZING HEAVY FUELS FOR OPERATING INTERNAL-COMBUSTION ENGINES.

Application filed June 17, 1925. Serial No. 37,798.

My invention relates to internal combustion engines, and its object is to provide new and improved methods and means for efficiently utilizing heavy fuels, including those containing non-volatile particles, for operating internal combustion engines, particularly those operating on self-ignition.

It is a fact well known to internal combustion engineers, that there has always been considerable difficulty in operating engines on heavy fuels and that the use of heavy fuels has been confined to very large engines. In the first place, heavy fuels are difficult to meter in small quantities and it is hard to prepare such fuels properly for efficient combustion in the air charge in the working cylinder. Engines heretofore built for operating on heavy fuel have been of great weight per horse power developed. As all engineers know, heavy fuels contain non-volatile residual matter in considerable quantities, and this residue accumulates in the working cylinders and in due time causes scoring of cylinder walls, wedging of piston rings, pitting of valves, etc. Also, since the spray or injection valves for the fuel are comparatively complicated and mechanically delicate, they get out of order very easily in the use of heavy "dirty" fuels. Hence the up-keep of engines heretofore operating on so-called "dirty" fuels has been unduly high. Furthermore, the heat absorbed in getting the sprayed-in charges of heavy fuel in condition for combustion affects the efficiency of the engine by lowering the compression temperature. This has required the use of very high compression pressures.

The foregoing disadvantages and defects in the operation of engines on heavy oil are successfully overcome by the method and apparatus of my present invention. The essential idea underlying my invention comprises the treatment of a metered amount of fuel, intermingled with a gaseous medium under pressure, by subjecting the mixture to the action of a highly heated practically inert gas before its injection into the air charge in the working cylinder. The apparatus for this treatment is preferably so designed that the chamber in which the intermingled fuel and gaseous medium are treated by the action of hot gases retains the non-volatile particles of the fuel, which are thus prevented from entering the working cylinder. This chamber is also provided with means for compressing and displacing the heat-treated fuel charge prior to and during the time of injection into the working cylinder. The chamber construction is preferably such that non-volatile particles of fuel are caused to adhere in the chamber, which can be easily cleared out at periodic intervals. Furthermore, a most simple and substantial form of injection valve may be advantageously used in my invention.

The accompanying drawings illustrate, more or less diagrammatically, a practical form of apparatus adapted to carry out my new method of fuel treatment. In these drawings—

Fig. 1 represents a cross-sectional view of an engine equipped to operate in accordance with my invention, the parts being shown in position just before the top of the compression stroke;

Fig. 2 is a side view similar to Fig. 1, with the parts shown at the end of the compression stroke and during the period of fuel injection; and Fig. 3 shows diagrammatically a variable timing arrangement for the driving connections of the working piston, the two auxiliary pistons, and the cam shaft.

A working cylinder 1 (usually water-jacketed) has a piston 2 suitably connected with the crank-shaft. The piston may be of any practical construction, but at the present time I prefer a piston like that shown in my copending application, Serial Number 37,797, filed June 17, 1925. For this reason I have shown the piston head 3 provided with a central recess or depression 4, which forms part of the combustion chamber proper 5 when the piston is at the top of its stroke.

In the cylinder head 6, which is rigidly secured to the top of the cylinder, are mounted valves 7 and 8. If the engine is of the two-stroke type, these valves are both air scavenging valves. In a four-stroke engine, valves 7 and 8 might represent the air-inlet valve and exhaust valve. These valves are operated by any practical mechanism properly timed. In the drawings there is a camshaft 9 arranged to operate rocking levers 10 and 11 pivoted on shafts 12. The camshaft 9 also has a properly timed cam 9' for operating a simple injection valve 13. The valves 7, 8 and 13 are normally held closed by spring pressure. In the combustion chamber 5 there may be an ignition device 14.

A suitable pump indicated as a whole by P is conveniently arranged adjacent to the cylinder. The inlet port 15 of this pump is connected with a fuel supply device indicated as a whole by F. The operation of this pump and fuel supply device is fully described in my copending applications Serial Number 556,746, filed April 26, 1922, and Serial Number 619,772, filed February 17, 1923. All I need to say here about the operation of pump P is that the pipes 16 and 17 supply gaseous medium to the fuel supply device and to the pump for the purpose of metering and controlling the amount of fuel entering the pump cylinder. In the case of unusually heavy fuel, the gaseous medium flowing through pipes 16 and 17 may advantageously be hot clean exhaust gases, which help to heat up the fuel as it is carried into the pump cylinder. It will be understood that, in using this heavy fuel, means is provided to keep the fuel in a fluid state, so that it will freely flow to the jet of the supply device. In the broader aspect of my invention, any practical fuel metering and controlling mechanism may be employed, provided that a gaseous medium is used to intermingle with the fuel in the pump.

An intermediate pump, indicated as a whole by N, is connected with fuel pump P through a discharge passage 18 and through passage 19 with injection valve 13. The intermediate pump N consists of a chamber 20 larger in diameter than the piston 21, which works in the pump cylinder 22. The piston 21 is provided with pressure-retaining rings 23 near its lower end, so that they will always operate in the cylinder 22 proper. The intermediate pump chamber 20 is provided with a large gas-tight clean-out cover 24, which is readily removable and replaceable.

The operation of the engine above described is as follows:

In Fig. 1 the piston of fuel pump P is nearing the end of its vacuum stroke. On its previous compression stroke, this piston has compressed a metered fuel charge intermingled with a gaseous medium and discharged the same through valve-controlled passage 18 into the intermediate pump chamber 20 when the piston 21 was at the bottom of its stroke. At the time of the fuel discharge from pump P into chamber 20 of pump N, this chamber was filled with hot inert combustion gases. As shown in Fig. 1, the piston 21 is nearing the top of its compression-displacement stroke, and injection valve 13 is just about to be opened by cam 9'. The piston 2 in working cylinder 1 is compressing a previously enclosed air charge and is nearing the top of its compression stroke. It will be understood that the relationship between pistons p, 21 and 2 is controlled by properly timed mechanism, which need be neither shown nor described.

Almost immediately after the positions indicated in Fig. 1 are reached, the injection valve 13 opens, and the fuel charge rushes out of chamber 20 through passage 19 under its own high compression and assisted by the further upward movement of the piston 21. As soon as the fuel enters the air charge in the combustion chamber 5, it is immediately ignited, either by self-ignition or by ignition device 14. Fig. 2 illustrates the pump piston p at the bottom of its stroke, drawing in a charge from the supply device F; the piston 21 of the intermediate cylinder N at the top of its stroke with practically all the fuel charge forced into the combustion chamber 5 of the working cylinder; and piston 2 in the working cylinder at the top of its stroke with practically all the air charge in the working cylinder forced into intimate contact with the burning fuel in combustion chamber 5.

When I refer to the upward movement of piston 21 as the compression-displacement stroke, I do not mean to imply that the fuel charge is displaced out of chamber 20 during the entire upward stroke of piston 21. In fact, as stated, it is only during the last part of its upward stroke that the piston 21 acts to displace the compressed charge out of chamber 20. Therefore, when in the claims I speak of simultaneously compressing and displacing the charge in chamber 20, I mean that these two operations are occasioned by the same stroke of piston 21, irrespective of any length of time (as represented by the piston movement) during which these operations take place.

The piston 21 begins to descend shortly after reaching the position in Fig. 2, and as the injection valve 13 is still held open by cam 9', hot combustion gases are both drawn and forced into chamber 20. The valve 13 is allowed to close by cam 9' when the chamber 20 is filled with hot and practically inert combustion gases. As the chamber 20 is being filled with these gases, piston p is compressing a fuel charge intermingled with a gaseous medium in the pump P. At the top of the stroke of piston p, this fuel charge is forced past the spring-controlled valve 25, normally closing the cylinder of pump P, into the hot combustion gases in chamber 20. It will be understood that the compression in pump P will always be sufficient to overcome the pressure in chamber 20 and discharge the contents of pump P quickly into the hot gases in chamber 20.

Referring specifically to the use of the intermediate pump N, I have found, when using particularly heavy oils,—such as still residues, tar distillates, asphaltum-base, crude oils, etc.—that it is not mechanically practical to properly prepare this fuel in the single stage process which takes place in pump P. Should we subject such fuels in pump P to sufficient temperature and pressure to properly prepare them for efficient combustion in the air charge in the working cylinder, we should find deposited in pump P and on piston $p$, the involatile residues of the fuel. Also, this residual matter will prevent the valve 25 in the pump P from closing the cylinder and from otherwise operating properly.

In order to properly prepare this heavy fuel and at the same time keep the mechanism in an operable state under actual working conditions, I provide the intermediate heating chamber and pump N. From what has been previously said, it will be understood that by partially preparing the fuel in pump P, it is in an ideal state for absorbing heat in chamber 20 from the very hot compressed gaseous medium in this chamber. As this gaseous medium, in this particular case, consists of practically inert (non-oxygen bearing) combustion gases from the working cylinder, the fuel will not burn in these gases during its treatment. The heat in chamber 20 is sufficient to practically gasify such portions of the fuel as are volatile. The non-volatile particles of the fuel adhere to the walls of the chamber and to the head of the piston 21, where they can be readily removed at predetermined intervals through the opening of the cleaning-out plug 24. I may mention that it is desirable to water-jacket the cylinder 22 below chamber 20, as indicated in the drawing, so that the piston rings 23 may be properly lubricated and the cylinder 22 not warped or damaged by the heat in chamber 20. Whatever incrustations adhere to the walls of chamber 20 and to the head of piston 21 will not interfere with the mechanical operation of piston 21 in cylinder 22. It is advisable to have some form of scraper at the point where cylinder 22 joins chamber 20, for removing any incrustations from piston 21 before it enters cylinder 22 on the downstroke. It is not feasible to make the plunger portion of piston 21 of reduced size, for that would carry the involatile residues of the fuel onto the walls of cylinder 22.

The compression of the fuel mixture is higher in the intermediate pump N than in pump P, and this higher compression gives the required injection velocity of the fuel mixture into the working cylinder.

In large engines, or in engines operating continuously, I may use two intermediate pumps, so that one can be cleaned out while the other is working. The pumps P and N having a very small volumetric capacity compared to that of the working cylinder, require very little power to operate them. In the diagrammatic drawings I have not attempted to show the correct relative proportions of the pump and working cylinder.

One of the very important results of my new method of treating heated fuel is that, by preparing the fuel in the manner described, it is possible to operate with self-ignition when using considerably lower compression in the working cylinder than has heretofore been practical.

In order to obtain the most efficient combustion in the working cylinder, the relationship of working piston 2, pump piston $p$, plunger piston 21 and injection cam 9' may be controlled by any practical mechanism. By way of illustration, I have diagrammatically indicated in Fig. 3 a crank-shaft gear C connected by a driving chain 26 with sprocket gears 27, 28 and 29. Sprocket gear 27 drives the cam shaft 9 having the cam 9' for operating the injection valve 13, as previously explained. Sprocket gear 28 drives any suitable mechanism for operating the pump piston $p$. For simplicity, I have indicated such mechanism diagrammatically by a crank-throw pin $p'$. Sprocket gear 29 drives a suitable connection 21' (shown as a crank-throw pin) for operating the plunger piston 21 in pump N. It will be readily seen that by altering the relative positions of any of these sprocket wheels, the relationship in the operation of the injection valve 13, the working piston 2 and the auxiliary piston $p$ and 21 is correspondingly altered to produce the required conditions in the working cylinder. This will be clear to the skilled engineer without further explanation.

Although I have herein shown and described certain apparatus, I want it understood that I have done so merely to explain my invention to those skilled in the art and not by way of restriction or limitation. The principles of my invention may be carried out by other mechanisms than herein set forth. As regards the fuel-treating method of my invention, that is independent of my special form of apparatus, provided only that it is of practical design and construction. Also, although I have described my invention in connection with the use of heavy oils, it is apparent that the principle of my invention is applicable to engines running on other fuels than those previously mentioned.

What I claim as my invention is:

1. The method of efficiently preparing heavy fuels for burning in the working cylinder of an internal combustion engine, which comprises compressing an air charge in the working cylinder, filling a closed chamber with practically inert hot combustion gases under pressure, forcing a partially prepared metered amount of fuel intermingled with a gaseous medium into the chamber containing the hot gases under pressure, whereby the preparation of the fuel is completed in said chamber, and simultaneously compressing and displacing the charge in said chamber into the compressing air charge in the working cylinder.

2. The method of efficiently preparing heavy fuels for burning in the working cylinder of an internal combustion engine, which comprises compressing an air charge in the working cylinder, filling a closed chamber with practically inert hot combustion gases under pressure, forcing a partially prepared metered amount of fuel intermingled with a gaseous medium into the chamber containing the hot gases under pressure, whereby the preparation of the fuel is completed in said chamber and non-volatile particles of fuel are separated and adhere to the walls of said chamber, and simultaneously compressing and displacing the charge in said chamber into the compressing air charge in the working cylinder, the injected fuel charge being practically free of any solid particles.

3. The method of efficiently burning heavy fuels in the working cylinder of an internal combustion engine, which comprises compressing an air charge in the working cylinder, filling a closed chamber with practically inert hot combustion gases under pressure, forcing a partially prepared metered amount of fuel intermingled with a gaseous medium into the chamber containing hot gases under pressure, whereby the preparation of the fuel is completed in said chamber, simultaneously compressing and displacing the charge in said chamber into the compressing air charge in the working cylinder, and causing the injected fuel to ignite immediately as it enters the combustion chamber.

4. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert combustion gases, a second chamber for receiving a metered amount of fuel intermingled with a gaseous medium, means for compressing the fuel mixture in said second chamber for partially preparing the fuel, means for injecting the partially prepared fuel at a predetermined moment from the second chamber into the first chamber containing the hot combustion gases, whereby the preparation of the fuel is completed in the first chamber, a plunger piston in the first chamber to compress and displace the mixture out of the chamber, and means for operating said injection valve to open said communication at the proper time during said compressing and displacing of the mixture in order to inject the fuel charge into the compressing air charge in the working cylinder, where the completely prepared fuel immediately ignites or is ignited as it enters the air charge.

5. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert combustion gases, a second chamber for receiving a metered amount of fuel intermingled with a gaseous medium, means for compressing the fuel mixture in said second chamber for partially preparing the fuel, means for injecting the partially prepared fuel at a predetermined moment from the second chamber into the first chamber containing the hot combustion gases, whereby the preparation of the fuel is completed in the first chamber, a plunger piston in the first chamber to compress and displace the mixture out of the chamber, means for operating said injection valve to open said communication at the proper time during said compressing and displacing of the mixture in order to inject the fuel charge into the compressing air charge in the working cylinder, where the completely prepared fuel immediately ignites or is ignited as it enters the air charge, and means in the first chamber to retain therein non-volatile particles of fuel and thereby prevent these particles from entering the working cylinder.

6. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert combustion gases, a second chamber for receiving a metered amount of fuel intermingled with a gaseous medium, means for compressing the fuel mixture in said second chamber for partially preparing the fuel, means for injecting the partially prepared fuel at a predetermined moment from the second chamber into the first chamber containing the hot combustion gases, whereby the preparation of the fuel is completed in the first chamber, a plunger piston in the first chamber to compress and displace the mixture out of the chamber, said chamber having a section of larger diameter than said plunger piston to provide an annular space for retaining non-volatile particles of fuel and thereby preventing them from entering the working cylinder, and means for operating said injection valve to open said communication at the proper time during said compressing and displacing of the mixture in order to inject the fuel charge into the compressing air charge in the working cylinder, where the completely prepared fuel immediately ignites or is ignited as it enters the air charge.

7. In an internal combustion engine, a fuel preparing chamber comprising a cylinder having properly arranged inlet and outlet openings, a plunger piston operable in said cylinder, the upper portion of said cylinder being of larger diameter than said piston to provide an annular space to the walls of which the non-volatile particles of fuel will adhere, and a removable plate for said cylinder to permit ready access to said annular space for cleaning out the same.

8. In an internal combustion engine, a fuel preparing chamber comprising a cylinder having properly arranged inlet and outlet openings, a plunger piston operable in said cylinder, the upper portion of said cylinder being of larger diameter than said piston to provide an annular space to the walls of which the non-volatile particles of fuel will adhere, a removable plate for said cylinder to permit ready access to said annular space for cleaning out the same, and a scraper in said annular space to remove solid particles from the plunger piston and thereby to prevent damage to the cylinder walls in which the piston operates.

9. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert combustion gases, a second chamber for receiving a metered amount of fuel intermingled with a gaseous medium, means for compressing the fuel mixture in said second chamber for partially preparing the fuel, means for injecting the partially prepared fuel at a predetermined moment from the second chamber into the first chamber containing the hot combustion gases, whereby the preparation of the fuel is completed in the first chamber, a plunger piston in the first chamber to compress and displace the mixture out of the chamber, means for operating said injection valve to open said communication at the proper time during said compressing and displacing of the mixture in order to inject the fuel charge into the compressing air in the working cylinder, whereby the completely prepared fuel immediately ignites or is ignited as it enters the air charge, and means for altering the relationship between the timing of the working piston, the timing of the operations in the first and second chambers, and the timing of the injection valve, in order to maintain the most efficient combustion conditions in the working cylinder under varying conditions of speed and load.

10. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert gases, an auxiliary cylinder for receiving a metered amount of fuel intermingled with a gaseous medium, a piston in said auxiliary cylinder for compressing the fuel mixture therein and partially preparing the fuel, a valve normally closing said auxiliary cylinder and adapted to be opened at a predetermined moment to inject the compressed fuel mixture into said chamber containing the hot combustion gases, whereby the preparation of the fuel is completed in said closed chamber, a plunger piston in said chamber to compress and displace the mixture out of the chamber, and means for operating said injection valve to open said communication at the proper time during said compressing and displacing of the mixture in order to inject the fuel charge into the compressing air in the working cylinder, where the completely prepared fuel immediately ignites or is ignited as it enters the air charge.

11. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert gases, an auxiliary cylinder for receiving a metered amount of fuel and a given volume of a gaseous medium, a piston in said auxiliary cylinder for compressing the fuel mixture therein and partially preparing the fuel, a valve normally closing said auxiliary cylinder and adapted to be opened at a predetermined moment to inject the compressed fuel mixture into said chamber containing the hot combustion gases, whereby the preparation of the fuel is completed in said closed chamber, a plunger piston in said chamber to compress and displace the mixture out of the chamber, means for operating said injection valve to open said communication at the proper time during said compressing and displacing of the mixture in order to inject the fuel charge into the compressing air in the working cylinder, where the completely prepared fuel immediately ignites or is ignited as it enters the air charge, and means for altering the relationship between the movements of the three pistons and the injection valve in order to maintain the most efficient combustion conditions in the working cylinder under varying conditions of speed and load.

12. In an internal combustion engine, a fuel-preparing device comprising a cylinder having two sections of different diameters, the section with the larger diameter constituting a fuel-preparing chamber having properly arranged inlet and outlet openings, a plunger piston fitted with sealing rings at its lower end and operable in the cylinder section of reduced diameter to compress a fuel mixture in the other section of the cylinder, said sealing rings being arranged to operate always in said section of reduced diameter, and means for cooling the cylinder section of reduced diameter.

13. In an internal combustion engine, a working cylinder adapted to receive an air charge which is compressed by the working piston, a closed chamber in communication with the combustion chamber in the working cylinder at predetermined intervals, an auxiliary cylinder for receiving a metered amount of fuel intermingled with a gaseous medium, a piston in said auxiliary cylinder for compressing the fuel mixture therein and partially preparing the fuel, a valve normally closing said auxiliary cylinder and adapted to be opened at a predetermined moment to inject the compressed fuel mixture into said chamber containing the hot combustion gases, whereby the preparation of the fuel is completed in said closed chamber, a plunger piston in said chamber to compress and displace the mixture out of the chamber, and means for holding said communication open during the proper interval to inject the fuel charge out of said chamber into the compressing air charge in said working cylinder for immediate ignition therein and to fill said chamber with combustion gases from the working cylinder.

14. In an internal combustion engine, a working cylinder adapted to receive an air charge, a piston operable in said cylinder, an auxiliary cylinder having a piston for compressing a mixture of fuel and gaseous medium to a predetermined degree, a second auxiliary cylinder, means for admitting a hot and practically inert gaseous medium into said second cylinder under lower pressure than the pressure of said fuel mixture in the first auxiliary cylinder, means for connecting the second cylinder at predetermined intervals with the first cylinder to receive the fuel mixture from said first cylinder, a piston in said second auxiliary cylinder to compress the fuel mixture to a higher degree than it was compressed in the first cylinder, and a properly timed valve for discharging the highly compressed fuel mixture from the second cylinder into the working cylinder at the required velocity.

15. In an internal combustion engine, a working cylinder adapted to receive an air charge which is compressed by the working piston, a closed chamber in communication with the combustion chamber in the working cylinder, a properly timed injection valve for controlling said communication to fill said closed chamber with hot and practically inert combustion gases, a second chamber for receiving a metered amount of fuel intermingled with a gaseous medium, means for compressing the fuel mixture in said second chamber for partially preparing the fuel, means for injecting the partially prepared fuel at a predetermined moment from the second chamber into the first chamber containing the hot combustion gases, whereby the preparation of the fuel is completed in the first chamber, a plunger piston in the first chamber to compress the fuel mixture to a higher degree than it was compressed in the second chamber, means for operating said injection valve to open said communication at the proper time after said increased compression has been obtained in the first chamber in order to inject the fuel charge into the compressing air charge in the working cylinder at the required velocity, and means for causing immediate ignition of the prepared fuel as it enters the air charge.

FRANZ L. MAEDLER.